Figure 1:
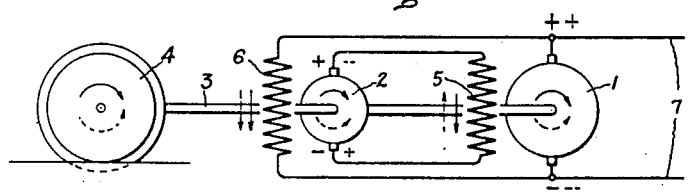

Sept. 25, 1934.  F. B. HORNBY  1,974,990

ELECTRICAL GENERATOR SYSTEM

Filed May 13, 1932

Inventor:
Fred B. Hornby,
by *Charles E. Tullar*
His Attorney.

Patented Sept. 25, 1934

1,974,990

UNITED STATES PATENT OFFICE 1,974,990

ELECTRICAL GENERATOR SYSTEM

Fred B. Hornby, Lynn, Mass., assignor to General Electric Company, a corporation of New York Application May 13, 1932, Serial No. 611,144

1 Claim. (Cl. 171—313)

My invention relates to electrical generator systems and more particularly to dynamo electric generators which are adapted to be rotated in reverse directions and at variable speed.

There are numerous locations where a moderate amount of electrical energy is required but where the only convenient source of rotation for driving a generator is either reversible in direction, or widely variable in speed, or both. A typical example of the latter is railway rolling stock, for which the source of energy is usually an axle driven generator. Passenger cars require a reliable source of constant potential electrical energy for lighting purposes whether they are standing or moving and such cars are usually provided with relatively complicated electrical systems including storage batteries and generator voltage regulators. Certain types of freight cars also require electrical energy. An example is refrigerator cars which are provided with electrical refrigerators, or which are provided with motor operated fans or blowers to circulate the air in the cars. In the case of freight cars great reliability and freedom from inspection and repair of the electrical equipment are necessary.

Reversibility of the source of rotation for driving a generator introduces certain operating problems. Thus an ordinary self excited generator will not build up voltage when its direction of rotation is reversed because reversal of rotation reverses the polarity of the voltage produced by residual magnetism and this reversal of polarity acts to buck the residual magnetism to zero, thereby preventing voltage build up. Furthermore, even if the voltage should build up it would be with reverse polarity which, if storage batteries were to be charged, would be highly undesirable.

A number of ways for insuring build up with reversible rotation, regardless of polarity, and also constant polarity build up, are known; but they all require auxiliary apparatus such as polarity responsive reversing switches or friction operated brush shifting yokes, which are subject to derangement, which are relatively delicate and complicated in construction; and which require relatively more frequent attention than does the generating equipment itself.

In accordance with an important feature of my invention, I provide a simple arrangement for providing what may be termed self-excited build up of reversibly driven generators, which is as rugged as the generating equipment itself. Broadly speaking, I accomplish this result by the use of two generators, each of which acts as an exciter for the other. In addition, by insuring that one generator has a stronger residual magnetism than the other, the polarity of build up of the generator with the weaker residual magnetism will be the same regardless of its direction of rotation.

Variations in generator speed usually produce variations in generator voltage. In many systems, such as systems having incandescent lamps, or storage batteries, substantially constant voltage is required. Furthermore, in any system in which the range of generator speed is the same as the range of railway rolling stock speed, the variation in voltage of an unregulated axle driven generator would be so great as to prevent satisfactory operation of almost any type of load device.

In accordance with another feature of my invention, I provide an inherently regulated system consisting of my generator build up combination and a load, such as a motor for operating a fan in a refrigerator car.

An object of my invention is to provide a new and improved generator system.

Another object of my invention is to provide a new and improved arrangement for insuring voltage build up of reversibly driven generators.

A further object of my invention is to provide a new and improved arrangement for insuring constant polarity build up of reversibly driven direct current generators.

An added object of my invention is to provide a new and improved inherently regulated electrical system in which the generating equipment is adapted to be operated at widely varying speeds and in reverse directions.

My invention will be better understood from the following description taken in connection with the accompanying drawing, and its scope will be pointed out in the appended claim.

Figure 2:
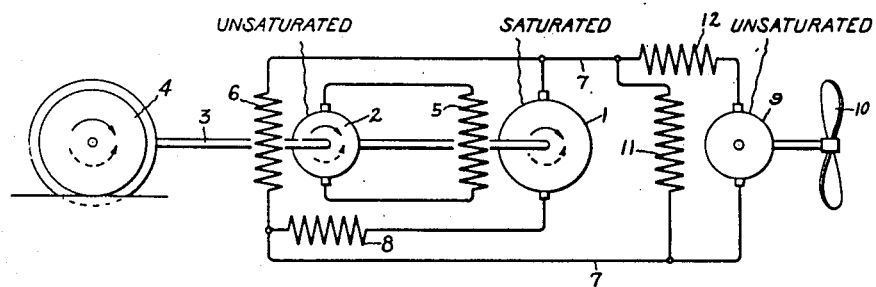
Figure 3:
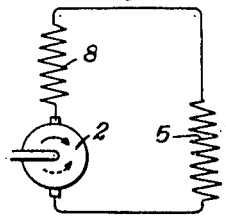

In the drawing, Fig. 1 illustrates diagrammatically my generator system for providing constant polarity build up regardless of the direction of rotation of the system. Fig. 2 is a diagrammatic illustration of an inherently regulated system including the generator system in Fig. 1, while Fig. 3 is a part illustration of a modification of Fig. 2.

Referring now to Fig. 1 of the drawing, it will be seen that I have provided two generators 1 and 2, respectively. These generators may be driven in any suitable manner, and as shown they are mounted on an axle, or shaft, 3 which is connected to be driven by a car wheel 4. Generators 1 and 2 are provided with field windings 5 and 6, respectively, and these windings are so connected that each generator acts as an exciter for the other generator. Thus field winding 5, of generator 1, is connected to be energized by generator 2, while field winding 6 of generator 2 is connected to be energized by generator 1. A load circuit 7 is connected to be energized by generator 1.

The operation of the above described arrangement for giving constant polarity voltage build up of generator 1, regardless of the direction of rotation of this generator 1, will now be described.

In order to secure this operation it is necessary that generator 2 have a stronger residual magnetism than generator 1. This may be accomplished in a number of ways. For example, if generator 2 is constructed as an ordinary exciter while generator 1 is constructed as an ordinary direct current generator, the usual short air gap which is provided in the exciter will be sufficient to give generator 2 a relatively stronger residual magnetism than generator 1. However, in practice generator 2 could be provided with steel field poles, or with field poles of other material which has a relatively stronger residual magnetism than the usual soft iron used for field poles.

Assume now that the generators 1 and 2 and the car wheel 4 are rotating in a clockwise direction, as indicated by the solid direction of rotation indicating arrows. Assume further that the polarities of the generators 1 and 2 are, as indicated by the solid polarity markers, applied to these generators, and that the direction of current through the field windings 5 and 6 is in the direction of the solid arrows associated therewith.

If now the direction of rotation of the generators is reversed the following action takes place. Each generator will try to reverse the residual magnetism of the other generator because of the polarity reversal of each generator due to the reversal of rotation. However, as the residual magnetism of the generator 2 is stronger than that of generator 1 the reverse polarity voltage induced in generator 2 will actually reverse the residual magnetism of generator 1 before the latter can reverse the residual magnetism of the generator 2. As soon as the residual magnetism of generator 1 reverses its polarity will build up in the same direction as it originally had due to the combined effect of reversal rotation and reversal of field. As soon as this takes place the energization of the field winding 6 of generator 2 will be in the same direction as originally, as is shown by the dotted arrow, and consequently generator 2 will build up with its polarity reversed due to the fact that only the direction of rotation has been reversed. This is indicated by the dotted polarity indication associated with generator 2. The dotted arrow associated with field winding 5 of generator 1 shows the reversal of field energization of generator 1 when the rotation of the generator is in the reverse direction indicated by the dotted direction of rotation indicating arrow associated therewith.

If constant polarity is not important, and all that is necessary is that generator 1 build up when its rotation is reversed, it is not necessary to insure that generator 2 has a stronger residual magnetism than generator 1. With any two generators one will always have a stronger residual magnetism than the other and consequently where any two generators are connected, as shown in Fig. 1, one of the generators will always reverse the polarity of the other, and as soon as this takes place the generators will build up as explained above. Furthermore, if polarity is not important either of the generators, or both of the generators, may be used to supply any suitable load devices with current.

In the arrangement shown in Fig. 2 generators 1 and 2 may be arranged to be operated in a magnetically saturated, or unsaturated, condition during normal operation. A magnetically saturated generator 1 and unsaturated exciter 2 is preferable. The purpose of saturation is to produce a certain degree of voltage regulation with changes in speed because with saturation of one machine the increase in voltage of its exciting machine whether saturated or not, will not react on the saturated machine through an increase in flux. Consequently the voltage changes will be those due to speed alone. A differential series field winding 8 is provided on exciter 2 so that as the voltage of generator 1 increases and its current output increases the increased energization of the field winding 8 will act to demagnetize the exciter 2 and consequently reduce its voltage. This, in turn, will reduce the voltage of generator 1. A motor 9 is connected to be energized by generator 1 through circuit 7 and this motor may operate any suitable load device, such as a fan 10, for example. Motor 9 is provided with a shunt winding 11 and a relatively heavy cumulative compound winding 12 for giving poor speed regulation with changes in load.

In the operation of the arrangement of Fig. 2 the build up and polarity action will be the same as in Fig. 1, so that regardless of the direction of rotation of the generators 1 and 2 these generators will always build up. However, in the arrangement shown in Fig. 2, it is not important that the polarity of generator 1 be always the same because of the fact that motor 9 is not sensitive to polarity changes. As the speed of the generators 1 and 2 increases the voltage output of generator 1 will increase and this will tend to increase the current supplied to the motor 9. This increase in current flowing through differential series field winding 8 will tend to demagnetize the exciter 2, thereby reducing its voltage output which will reduce the excitation of generator 1 thereby reducing its voltage output. At the same time, the increase in speed of the generator 1 causes more power to flow to motor 9 thereby tending to increase its speed and load. However, as the speed and load of motor 9 increase it draws more current through its series winding 12 which increases the flux of motor 9, thereby tending to limit its increase in speed. It is preferable that motor 9 be unsaturated during normal operation so that the full effect of the series winding 12 will be obtained. With the arrangement shown in Fig. 2 I have been able to obtain a motor speed ratio of 1 to 3 with a generator speed ratio of 1 to 4.

In connection with the differential series field winding 8 it will readily occur to those skilled in the art that my invention is not limited to the particular connection shown and that this winding may be connected in the usual manner in the armature circuit of exciter 2 rather than in the main load circuit of the system, if desired. Such a connection is shown in Fig. 3.

While I have shown and described particular embodiments of my invention, it will be obvious to those skilled in the art that changes and modifications may be made without departing from my invention, and I therefore aim in the appended claim to cover all such changes and modifications as fall within the true spirit of my invention.

What I claim as new and desire to secure by Letters Patent of the United States is:

In combination, an axle driven direct current generator adapted to have its magnetic circuit saturated during normal operation, a direct connected exciter for said generator, connections for energizing the field winding of said exciter from said generator, a compound wound direct current motor adapted to have its magnetic circuit unsaturated during its normal operation, and a differential series winding for said exciter, and connections between said generator and said motor including said differential winding.

FRED B. HORNBY.